United States Patent [19]

Ermacora et al.

[11] Patent Number: 4,669,256
[45] Date of Patent: Jun. 2, 1987

[54] ROTARY MOWER HAVING A STABILIZATION DEVICE

[75] Inventors: Rino Ermacora, Saverne; Patrice Jehl, Bouxwiller, both of France

[73] Assignee: Kuhn S.A., Saverne, France

[21] Appl. No.: 788,117

[22] Filed: Oct. 16, 1985

[30] Foreign Application Priority Data

Oct. 16, 1984 [FR] France .............................. 84 15943

[51] Int. Cl.⁴ .......................................... A01D 34/63
[52] U.S. Cl. .................................................... 56/13.6
[58] Field of Search ............................ 56/6, 13.6, 208

[56] References Cited

U.S. PATENT DOCUMENTS

| | | | |
|---|---|---|---|
| 2,734,326 | 2/1956 | Gebhart | 56/13.6 |
| 4,174,602 | 11/1979 | Webb et al. | 56/208 |
| 4,177,625 | 12/1979 | Knight et al. | 56/13.6 |
| 4,206,583 | 6/1980 | Week et al. | 56/208 |
| 4,286,423 | 9/1981 | Caldwell et al. | 56/6 |
| 4,348,857 | 9/1982 | Berlivet et al. | 56/13.6 |

FOREIGN PATENT DOCUMENTS 2757211  6/1978  Fed. Rep. of Germany ....... 56/13.6

*Primary Examiner*—Paul J. Hirsch
*Attorney, Agent, or Firm*—Oblon, Fisher, Spivak, McClelland & Maier

[57] ABSTRACT

The tip of the arm 4 which acts on the stabilization device 26 during the pivoting of the arm 4 is located in the vicinity of the pivoting axis 6 of the arm 4 or behind the axis 6. A damping jack 263 may be used as the stabilization device.

25 Claims, 7 Drawing Figures

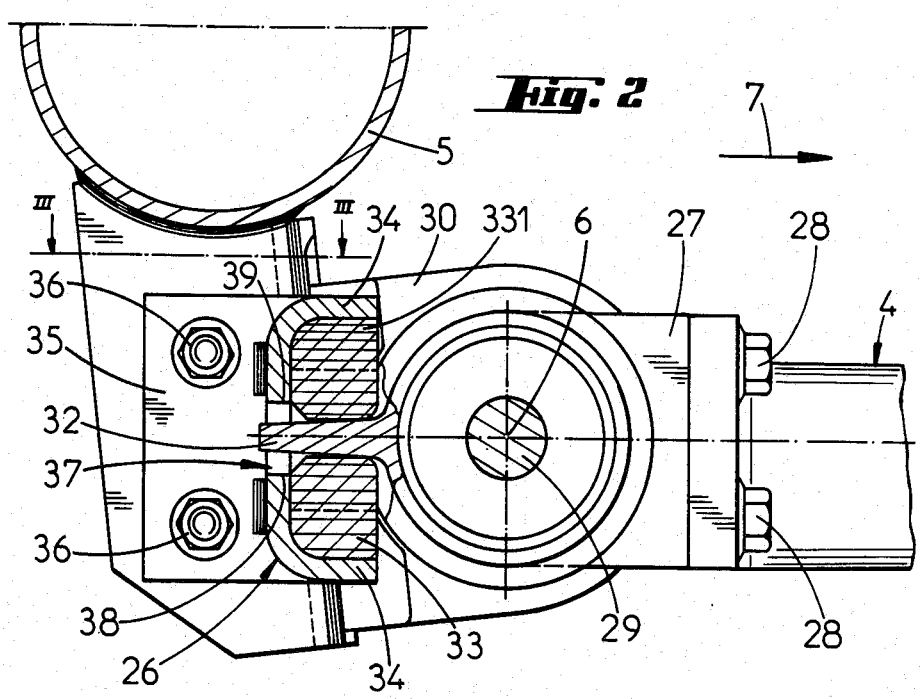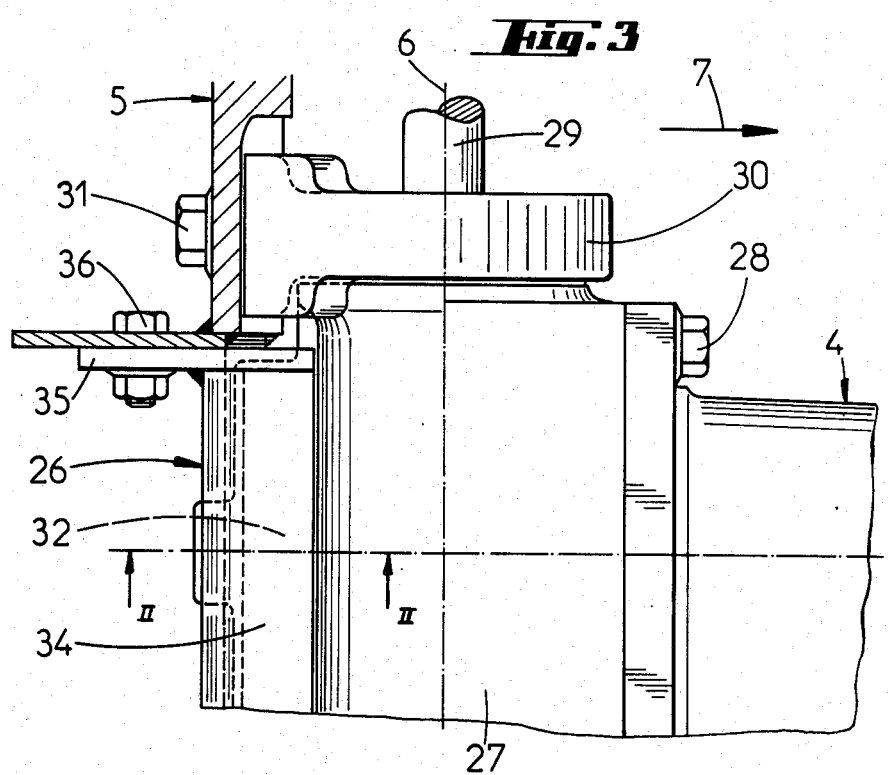

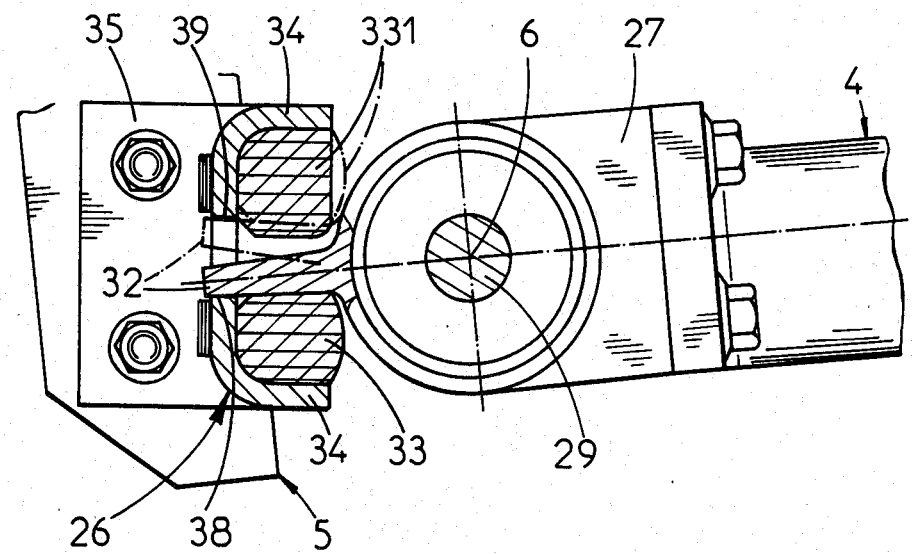
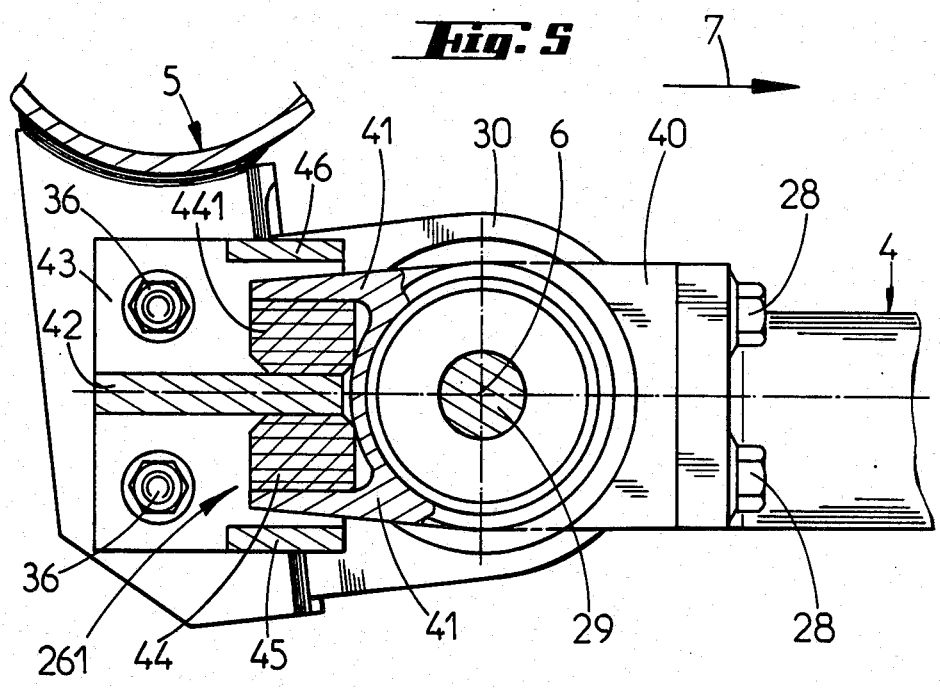

ROTARY MOWER HAVING A STABILIZATION DEVICE

FIELD OF THE INVENTION

This invention relates to a rotary mower equipped with at least one cutting head disposed on the free end of an arm. The arm is mounted at its other end on the frame of the rotary mower so as to be able to pivot in opposition to a stabilization device around an axis directed crosswise in relation to the direction of advance of the rotary mower when working.

BACKGROUND OF THE INVENTION

A rotary mower the stabilization device of which consists of a telescopic damper is known. The anchoring point of the telescopic damper on the arm is located approximately half way between the axis of rotation of the cutting head or heads and the axis directed crosswise in relation to the direction of advance of the rotary mower when working. The arm can pivot around the crosswise axis. From this anchoring point, the telescopic damper extends backwardly and upwardly.

The known arrangement has drawbacks. Considering the position on the telescopic damper and particularly the position of its anchoring point on the arm, in practice it occurs rather frequently that the crop cut by the cutting head or heads remains caught on the telescopic damper. This catching of crop is a nuisance because it can cause jams.

Moreover, when the rotary mower is equipped with a means for transporting the cut crop such as a drum equipped with projections and revolving around an axis directed crosswise in relation to the direction of advance of the rotary mower when working, it can be advantageous (to increase the effectiveness of the transport means) also to have projections in the vertical plane containing an arm. With the arrangement of the telescopic damper on the known rotary mower, it is impossible to make such projections.

OBJECT OF THE INVENTION

This invention has as its object the elimination of the foregoing drawbacks of the known rotary mower.

SUMMARY OF THE INVENTION

The rotary mower according to the invention is characterized by the fact that the tip of the arm which acts on the stabilization device during the pivoting of the arm is located in the vicinity of the pivoting axis of the arm or behind that axis. With this characteristic, the stabilization device, and particularly the tip of the arm which acts on the stabilization device during the pivoting of the arm, are relatively far from the cutting head or heads. Accordingly, the risks of catching cut crop is substantially diminished, if not eliminated. This risk is particularly reduced when the stabilization device is located entirely or in part behind the pivoting axis of the arm.

The risk of catching crop on the arm is further diminished when the bulk of the stabilization device, which comprises at least one deformable element, is small. Because of this, it suffices, for example, that only pivoting of the arm upwardly is done in opposition to the stabilization device.

An important role of the stabilization device is to maintain as well as possible the position of the cutting head in relation to the surface of the ground to obtain a good cutting quality. This means that the cutting head is prevented from bouncing continually with a more or less great amplitude when it passes over the numerous bumps in the terrain on which the mower typically operates. However, when the cutting head goes into a hole, it can by itself, because of its weight, take the position closest to the surface of the ground. Nevertheless, to avoid too great stresses on the arm when coming out of a hole into which the cutting head has fallen, it is advantageous also to brake the fall of the cutting head—i.e., the pivoting of the arm downwardly. For this purpose, in an embodiment according to the invention, the stabilization device comprises two deformable elements which act between the arm and the frame of the rotary mower. Advantageously, it is possible for either the arm or the frame of the machine to comprise a protrusion which extends between the two deformable elements. Moreover, these deformable elements can extend between two support elements mounted on either the frame of the rotary mower or the arm.

Also advantageously, at least one of the support elements can be adjustable. This adjustability of at least one of the support elements can, for example, serve to prestress the deformable elements. This prestressing of the deformable elements makes it possible, for example, to adapt the stabilization device to the various conditions under which the rotary mower is called on to work. The adjustable support element can consist of a bolt or any similar means.

The deformable elements can consist of blocks of rubber or of a similar material. They can also consist of springs, or, particularly advantageously, of a stack of spring washers.

According to another characteristic of the invention, the stabilization device is a hydraulic damper. Advantageously, the hydraulic damper is, in addition, a hydraulic jack. It is thus possible in addition to increase the ground clearance of the machine during transport by causing the arms with their cutting heads to pivot upwardly simultaneously with the withdrawal of the frame of the machine from the ground. It should be noted that, in the rotary mower of the prior art, there are small jacks to cause the arms and their cutting heads to pivot upwardly. The damping jack of the invention is distinguished from this prior art by the fact that the jack and the stabilization device are made in a single subunit. This makes it possible to decrease the bulk substantially. In addition, the cost can be lowered.

According to an embodiment of the invention, the damping jack comprises two piston-cylinder mechanisms. These two piston-cylinder mechanisms can communicate with each other by an opening blocked by an element which prevents the exit of the fluid from the damping piston-cylinder to the jack piston-cylinder. This arrangement makes it possible to perform purging of the damping piston-cylinder easily. The damping jack of the invention is relatively compact. It can easily be made when the two pistons form a single part, and when the cylinders are made in two different parts which are connected to one another. This connection is advantageously made by screwing.

According to an additional characteristic of the invention, the pivoting of the arm upwardly and/or downwardly is limited by a stop in a manner known in the art. The stops can consist of the deformable elements themselves.

According to another embodiment, the arm or the frame of the rotary mower can comprise at least one protrusion which cooperates with stops mounted on the frame of the rotary mower or on the arm. Advantageously, the protrusion or the protrusions can consist of the protrusion of the arm or the frame of the rotary mower which extends between deformable elements.

In the case of the damping jack of the invention, pivoting of the arm upwardly and/or downwardly can be limited by the limits of travel of the damping piston in the damping cylinder.

The invention also relates to a damping jack as described above.

BRIEF DESCRIPTION OF THE DRAWINGS

Other characteristics and advantages of the invention will be apparent from the following description of some nonlimiting examples made in conjunction with the accompanying drawings.

FIG. 2 is a side view partially in section of a first embodiment of a stabilization device made according to the invention.

FIG. 3 is a half-view from above partially in section of the embodiment of FIG. 2.

FIG. 4 is a side view partially in section of the embodiment of FIGS. 2 and 3, showing the mode of operation of the stabilization device.

FIG. 5 is a side view partially in section of a second embodiment of a stabilization device made according to the invention.

DETAILED DESCRIPTION OF THE PRESENTLY PREFERRED EMBODIMENTS

The First Embodiment

Figure 1:
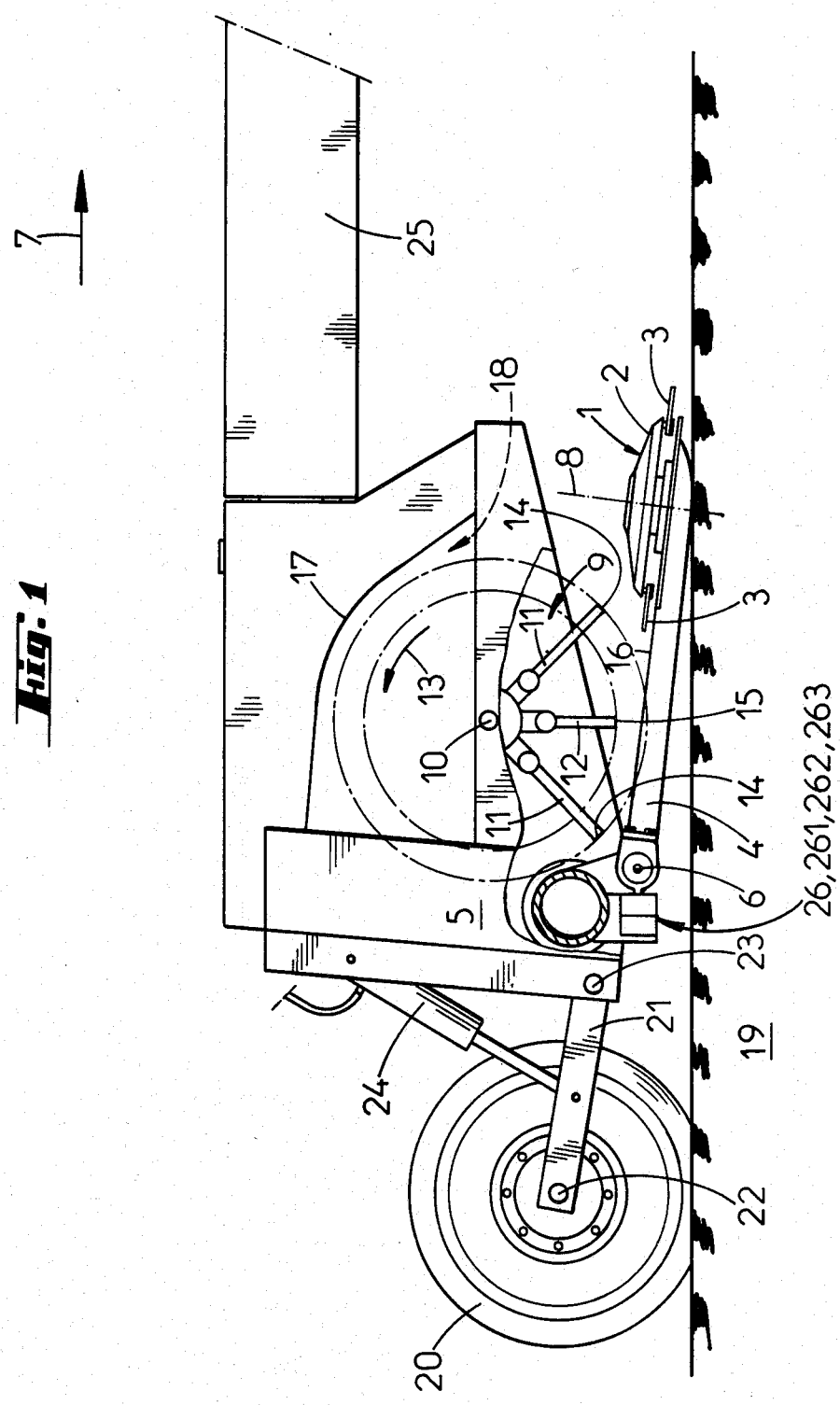
FIG. 1 is a side view partially in section of a mower according to the invention.

FIG. 1 shows a mower equipped with cutting heads 1. Each cutting head 1 is made up of a rotary disk 2 equipped with cutting tools 3. Each rotary disk 2 is attached to the free end of an arm 4 so that the free end of the arm 4 is under the rotary disk 2. The arm 4 is connected to a frame 5 of the rotary mower so as to be able to pivot around an axis 6. The axis 6 is directed crosswise in relation to the direction of advance of the rotary mower when working, indicated by an arrow 7. The rotation of the rotary disk 2 around an axis 8 is produced by drive means which are known to persons of ordinary skill in the art.

A transport drum 9 for crop cut by the cutting heads 1 is provided. The axis of rotation 10 of the transport drum 9 is directed crosswise to the arrow 7 and is above the arm 4. The transport drum 9 is equipped with projections 11 and 12. The transport drum 9 is driven in rotation around the axis 10 in the direction indicated by an arrow 13 by drive means which are known by persons of ordinary skill in the art.

Projections 11 extend between two neighboring arms 4. The length of the projections 11 is such that the free ends 14 of the projections 11 extend, during the rotation of the transport drum 9, into the space located between the arms 4. Projections 12 are located in the vertical planes that contain the arms 4. The lengths of the projections 12 is such that the free ends 15 of the projections 12 do not touch the upper faces 16 of the arms 4 when the arms 4 are in their highest position.

Arranged above the transport drum 9 is a cover 17 which, with the transport drum 9, forms a transport channel 18.

In the back, the frame 5 of the rotary mower rests on the ground 19 with wheels 20. Each wheel 20 is connected to the frame 5 by a rocker arm 21 which is connected at one of its ends to a hub 22 of the wheels 20. The other end of the rocker arm 21 is connected to a pivot 23 placed at the lower part of the frame 5. Between the upper part of the frame 5 and the rocker arm 21 is mounted a jack 24 which makes it possible to keep the frame 5 away from the ground 19 for transport.

A tongue 25 which is used to connect the machine to a tractor vehicle, not shown, is secured in a way known to a person of ordinary skill in the art to the front of the frame 5. The drive means for the rotary disks 2 and for the transport drum 9 are, for example, driven by a drive shaft (not shown), which transmits the movement from the power take-off of the tractor vehicle to the drive means.

A stabilization device 26 which will be described in more detail below is placed near the end of the arm 4 where the arm 4 is connected to the frame 5.

FIGS. 2, 3 and 4 show a first embodiment of the stabilization device 26. The back end of the arm 4 is equipped with a housing 27 which is fastened to the arm 4 by bolts 28. The housing 27 is mounted on the frame 5 of the rotary mower so as to be able to pivot around the axis 6. The axis 6 corresponds to the longitudinal axis of a drive shaft 29 for the drive means housed, in a way known to persons of ordinary skill in the art, in the arm 4. The drive means are used to cause each rotary disk 2 to rotate around its axis 8. To do this, the housing 27 is connected to the frame 5 by two bearings 30 which are fastened to the frame 5 by bolts 31.

Each housing 27 comprises in the back, considering the direction of advance of the rotary mower when working, a protrusion 32. The protrusion 32 extends between two deformable elements 30, 331. In the example illustrated, each of the deformable elements 30, 331 consists of a block of rubber or of similar material. The deformable elements 33, 331 have an approximately rectangular section and are each held on the frame 5 by a support 34 in the shape of an angle iron. The two supports 34 are placed in relation to one another so as to form approximately a U laid open toward the front. The two supports 34 are held in this relative position in the illustrated embodiment by being welded on two plates 35. The unit consisting of the supports 34 and the plates 35 is mounted on the frame 5 using bolts 36. It is possible, within the framework of the invention, for each of the two deformable elements 33, 331 to be glued on its respective support 34. In this way, the unit consisting of the deformable elements 33, 331, the supports 34, and the plates 35 forms a complete stabilization device 26.

As can be seen in FIGS. 2 and 4, there is a certain space 37 between the two supports 34 in which the free end of the protrusion 32 on the housing 27 extends. The two supports 34 thus also constitute stops 38, 39 which limit the rotation of the protrusion 32 and, therefore, of the arm 4 around the axis 6. This arrangement thus makes it possible, on the one hand, to avoid interference between the arm 4 and the transport drum 9 and, on the other hand, to keep the arm 4 at a certain position in relation to the ground 19 when the frame 5 is in its high position for transport.

FIG. 4 illustrates the operation of the device. The highest position of the arm 4 has been shown in solid lines. This highest position occurs when the free end of the arm 4 passes over a very large bump. The protrusion 32 on the housing 27 has been shown in broken lines in the lowest position of the arm 4. This lowest position occurs when the free end of the arm 4 goes into a very large hole or during transport when the frame 5 is far from the ground 19.

When the free end of the arm 4 goes over a bump, the arm 4 rotates around the axis 6. The protrusion 32 on the housing 27 then crushes the lower deformable element 33. This crushing of the deformable element 33 brakes the rotation of the arm 4. Thus, when the free end of the arm 4 reaches the top of the bump, the rotation stops almost immediately, and the deformable element 33 forces the arm 4 to return quickly into contact with the surface of the ground 19. This assures a good cutting quality. When the size of the bump is very great, the arm 4 can pivot around the axis 6 until the protrusion 32 comes into contact with the stop 38. Pivoting of the arm 4 is then blocked. This prevents, as stated above, interference of the arm 4 with the transport drum 9.

When the free end of the arm 4 encounters a hole, the weight of the arm 4 causes the free end of the arm 4 to fall into the hole. So as not to cause too great stresses in the arm 4 or in the rotary disk 2 on coming out of the hole when the hole is relatively deep, the rotation of the arm 4 downwardly around the axis 6 is braked by the upper deformable element 331, which is crushed by the protrustion 32. In this way, the free end of the arm 4 can pass over a hole without the free end having the time to fall to the bottom of the hole. The rotation of the arm 4 downwardly is restricted by the stop 39 for reasons analogous to those discussed above.

The Second Embodiment

FIG. 5 shows a second embodiment of a stabilization device 261 made according to the invention. In this example, the arm 4 is equipped with a housing 40 which comprises in the back, considering the direction of advance 7 of the rotary mower when working, two support lugs 41. As in the preceding example, the housing 40 is fastened to the arm 4 by the bolts 28. Also, the housing 40 is connected to the frame 5 by the two bearings 30 which allow it to rotates around the axis 6.

The frame 5 is equipped with a catch 42 which extends between two plates 43 to which it is fastened by welding, for example. The plates 43 are fastened to the frame 5 by the bolts 36.

Two deformable elements 44, 441, similar to the deformable elements 33, 331 of FIGS. 2–4, extend between the catch 42 of the frame 5 and the support lugs of the housing 40.

A stop 45 is fastened between the lower edges of the plates 43, while a stop 46 is fastened between the upper edges of the plates 43. The stops 45 and 46 have the same function as the stops 38 and 39 of the example of FIGS. 2-4—i.e., to limit the rotation of the arm 4 upwardly or downwardly. The blocking of the rotation of the arm 4 upwardly or downwardly is performed when the lower support lug 41 of the housing 40 comes into contact with the stop 45 and when the upper support lug 41 comes into contact with the stop 46, respectively.

The Third Embodiment

Figure 6:
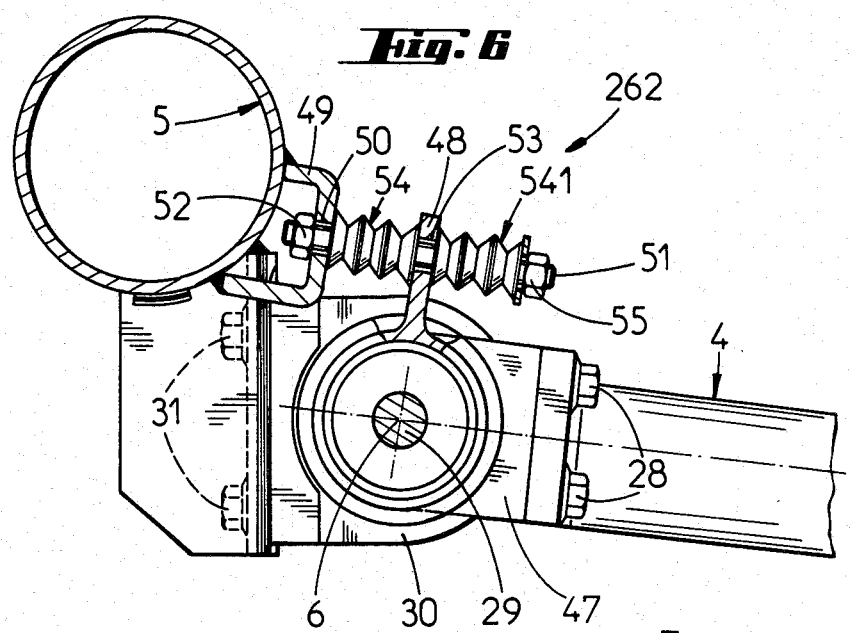
FIG. 6 is a side view partially in section of a third embodiment of a stabilization device made according to the invention.

FIG. 6 shows a third embodiment of a stabilization device 262 made according to the invention. In this example, the arm 4 is equipped with a housing 47 which comprises a protrusion 48 at its upper part.

As in the preceding example, the housing 47 is fastened to the arm 4 by the bolts 28. Also, the housing 47 is connected to the frame 5 by the two bearings 30 which are fastened to the frame 5 with the bolts 31 and which make it possible for the housing 47 to rotate around the axis 6.

Moreover, the frame 5 is equipped with a support flange 49 which is fastened there by welding, for example. The support flange 49 has a hole 50 through which a threaded rod 51 passes. On the end of the threaded rod 51 which goes through the support flange 49 is screwed a nut 52 which connects the threaded rod 51 to the support flange 49.

Moreover, the threaded rod 51 goes through a hole 53 made in the protrusion 48 of the housing 47.

A deformable element 54 is disposed between the support flange 49 and the protrusion 48. The deformable element 54 is composed of a plurality of spring washers slipped over the threaded rod 51. Another nut 55 is screwed on the other end of the threaded rod 51. A second deformable element 541, also composed of a plurality of spring washers, is disposed between the nut 55 and the protrusion 48.

It will be noted that, in this example, the position of the support element which holds the deformable element 541, in this case the nut 55 and the threaded rod 51, is adjustable.

Considering the construction of this stabilization device, and thanks to the possible adjustment of the nut 55, it is possible to adjust the rigidity of the stabilization device. By screwing the nut 55 in or out, the deformable elements 54, 541 are prestressed more or less. It is therefore possible, thanks to this means, to adapt the rigidity of the stabilization device to the various conditions under which the rotary mower is called on to work.

It will also be noted that, in this example, the limiting of the rotation of the arm 4 upwardly or downwardly is performed by the deformable elements 54, 541 themselves. In fact, the spring washers which make up the deformable elements 54, 541 can be deformed only by a certain value. When this value is reached, the deformable elements become undeformable and block the rotation of the arm 4 around the axis 6.

The Fourth Embodiment

Figure 7:
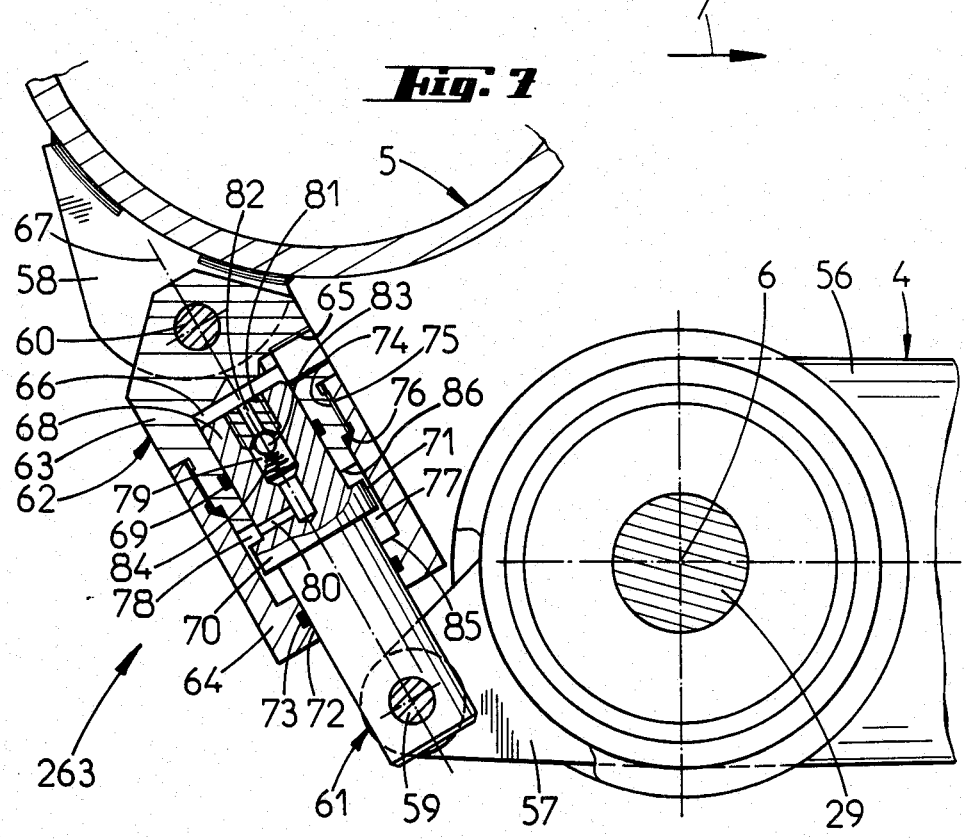
FIG. 7 is a side view partially in section of a fourth embodiment of a stabilization device made according to the invention.

FIG. 7 shows a fourth embodiment of a stabilization device 263 made according to the invention. In this example, the arm 4 is equipped with a housing 56 which comprises a fork 57 at its back part, considering the direction of advance 7 of the rotary mower when working.

As in the preceding examples, the housing 56 is fastened to the arm 4 by the bolts 28, but the bolts 28 are not shown in FIG. 7. Also, the housing 56 is connected to the frame 5 by the two bearings 30, which also have not been shown in FIG. 7 so as not to encumber the figure.

Moreover, the frame 5 is also equipped with a fork 58. The stabilization device 263 is fastened by pins 59, 60 between the forks 57 and 58.

The stabilization device 263 is a damping jack which comprises a rod 61 and a body 62. The body 62 is composed of two parts, a primary part 63 and a secondary part 64. The primary part 63 comprises a hole 65 to which a hydraulic pipe (not shown) is connected. The hydraulic pipe is used to bring hydraulic fluid from the tractor vehicle for example to the device. The hole 65 communicates with a bore 66 in the primary part 63. The bore 66 is coaxial with the longitudinal axis 67 of the stabilization device 263. The bore 66 defines the jack cylinder of the stabilization device 263. The end 68 of the rod 61 is introduced into the bore 66. Fluid tightness between the bore 66 and the end 68 of the rod 61 is assured by a seal 69. The end 68 of the rod 61 defines the jack piston.

Spaced from the primary part 63, the rod 61 comprises a shoulder 70 which has a larger diameter than the diameter of the rest of the rod 61. The shoulder 70 extends inside a bore 71 made in the secondary part 64 coaxial with the longitudinal axis 67 of the stabilization device 263. The free end of the rod 61 extends outside the secondary part 64 through a bore 72 that is concentric to the bore 71. Fluid tightness between the rod 61 and the bore 72 is achieved by a seal 73. The bore 71 and the shoulder 70 define the damping cylinder and the damping piston.

The secondary part 64 is screwed onto the primary part 63. For this purpose, the primary part 63 comprises a male threading 74, and the secondary part 64 comprises a female threading 75. Fluid tightness between the primary part 63 and the secondary part 64 is achieved by a seal 76.

The shoulder 70 divides the bore 71 into two chambers, a primary chamber 77 and a secondary chamber 78. The outside diameter of the shoulder 70 is slightly smaller than the inside diameter of the bore 71. In this way, the fluid contained in the bore 71 can be transferred from the primary chamber 77 into the secondary chamber 78 when the free end of the arm 4 rises. Similarly, the fluid contained in the bore 71 can be transferred from the secondary chamber 78 into the primary chamber 77 when the free end of the arm 4 descends.

The end 68 of the rod 61 comprises a hole 79 the axis of which is coaxial with the longitudinal axis 67. The hole 79 communicates with an opening 80 bored in the rod 61 perpendicularly to the longitudinal axis 67 and coming out in the bore 71. A sleeve 81 is screwed into the hole 79. The sleeve 81 has an axial opening 82 going all the way through it. The axial opening 82 is blocked by a ball 83 kept in place by a spring 84. Accordingly, the hydraulic fluid can go from the jack (i.e., from the bore 66) to the damper (i.e., to the bore 71), but not from the damper to the jack. This makes it possible to fill the damper with fluid and to purge it using the hydraulic pipe connected to the hole 65. To facilitate purging, the bore 71 can be equipped with a removable plug, not shown. It is understood that, when the damper is completely filled with fluid, the fluid which arrives in the jack will no longer be able to open the ball 83.

The damping jack operates in the following manner. In operation (i.e., when the arm 4 rests on the ground 19), the hydraulic fluid can freely enter or go out at the output of the jack. Thus, when the free end of the arm 4 is raised by a bump, the arm 4 rotates around the axis 6 in a counterclockwise direction in FIG. 7, and the housing 56 pulls on the rod 61, forcing the rod 61 to come out of the body 62. The hydraulic fluid contained in the primary chamber 77 is then transferred into the secondary chamber 78 through the neck formed between the bore 71 and the shoulder 70. Considering the small size of this neck, transfer of the hydraulic fluid is braked. This braking action almost immediately stops the rise of the arm 4 as soon as the arm 4 reaches the top of the bump. When the bump is passed, the weight of the arm 4 causes the arm 4 to rotate around the axis 6 in a clockwise direction in FIG. 7, and the housing 56 then pushes the rod 61, forcing it to reenter the body 62. The arm 4 thus returns to its position in contact with the ground 19.

The operation of the damper is similar when the arm 4 passes over a hole. In this case, the fall of the arm 4 is braked by the neck braking the transfer of the hydraulic fluid from the secondary chamber 78 into the primary chamber 77.

It will be noted that the rotation of the arm 4 around the axis 6 in one direction or the other (i.e., the rise or the fall of the free end of the arm 4) is limited by faces 85 and 86 of the primary chamber 77 and the secondary chamber 78, respectively. That is, the shoulder 70 strikes the faces 85 and 86 at the extremes of its travel.

When, at the end of a field or during transport, the arm 4 must be raised to be disengaged from the ground 19, hydraulic fluid is injected into the bore 66 through the hydraulic pipe connected to the hole 65. This injection of fluid pushes the end 68 of the rod 61. The rod 61 leaves the body 62 and causes the arm 4 to rotate around the axis 6 in a counterclockwise direction, thus causing the free end of the arm 4 to rise. It will be noted that, when the arm 4 is raised, the fluid contained in the primary chamber 77 of the damper is transferred into the secondary chamber 78. It will also be noted that the raising of the arm 4 by the jack is also limited by the face 85.

When the arm 4 must be lowered into a working position in which it is in contact with the ground 19, it is enough to release the pressure of the fluid in the jack cylinder. The weight of the arm 4 then forces the fluid back outside the jack, and the arm 4 can then descend.

Summary

In all of the examples that have just been described, it is seen that, according to the invention, the stabilization device and particularly the tip of the arm 4 that acts on the stabilization device during the pivoting of the arm 4 are located in the front area (FIG. 6) or in the back (FIGS. 1, 2, 3, 4, 5 and 7) of the axis 6. The stabilization device made according to the invention is therefore relatively far from the area of the cutting heads 1, so that the risks of catching cut crop are relatively slight—or, indeed, nonexistent.

It will also be noted that the stabilization devices 26, 261, 262, and 263 described in the examples are relatively compact, which can also be an additional factor for reducing the risks of catching cut crop.

As stated above, the examples described are not limiting. Thus, for example, it is possible to combine various solutions with one another. By way of a nonunique example, the stabilization device 26 of FIG. 2 could, for example, be replaced by the stabilization device 262 of FIG. 6, placed approximately vertically.

Finally, it will be noted that various modifications or improvements to the described examples are possible without going outside the scope of this invention.

What is claimed as new and desired to be secured by Letters Patent of the United States is:

1. A rotary mower equipped with at least one cutting head disposed on the free end of an arm that is mounted at its other end on the frame of the rotary mower so as to be able to pivot in opposition to a shock absorbing stabilization device around an axis directed crosswise in relation to the direction of advance of the rotary mower when working, the tip of the arm which acts on the shock absorbing stabilization device during the pivoting of the arm being located in the vicinity of the pivoting axis of the arm or behind the pivoting axis of the arm.

2. A rotary mower according to claim 1 wherein the shock absorbing stabilization device is located entirely or in part behind the pivoting axis of the arm.

3. A rotary mower according to claim 1 wherein at least the pivoting upwardly of the arm is performed in opposition to a force produced by the shock absorbing stabilization device.

4. A rotary mower according to claim 1 wherein the shock absorbing stabilization device comprises at least one deformable element.

5. A rotary mower according to claim 4 wherein:
   (a) the pivoting of the arm is damped upwardly and downwardly and
   (b) two deformable elements act between the arm and the frame of the mower.

6. A rotary mower according to claim 5 wherein:
   (a) a protrusion is formed on one of the arm and the frame and
   (b) the protrusion extends between the two deformable elements.

7. A rotary mower according to claim 5 wherein the two deformable elements extend between two support elements mounted on one of the frame and the arm.

8. A rotary mower according to claim 7 wherein at least one of the support elements is adjustable.

9. A rotary mower according to claim 4 wherein the deformable elements are prestressed.

10. A rotary mower according to claim 8 wherein the deformable elements are prestressed, and prestressing of the deformable elements is obtained by adjusting at least one of the support elements.

11. A rotary mower according to claim 8 wherein the adjustable support elements comprise a bolt.

12. A rotary mower according to claim 4 wherein the deformable elements comprise blocks of rubber or of a similar material.

13. A rotary mower according to claim 4 wherein the deformable elements comprise springs.

14. A rotary mower according to claim 13 wherein the springs comprise a stack of spring washers.

15. A rotary mower according to claim 1 wherein the shock absorbing stabilization device is a hydraulic damper.

16. A rotary mower according to claim 15 wherein the shock absorbing stabilization device is, in addition, a hydraulic jack.

17. A rotary mower according to claim 16 wherein the shock absorbing stabilization device comprises two piston-cylinder mechanisms.

18. A rotary mower according to claim 17 wherein the two piston-cylinder mechanisms communicate with one another through an opening blocked by an element which, in use, prevents the exit of hydraulic fluid from the damping piston-cylinder to the jack piston-cylinder.

19. A rotary mower according to claim 17 wherein:
   (a) the two pistons of the damping jack form a single part and
   (b) the cylinders are made in two different parts which are connected to one another.

20. A rotary mower according to claim 19 wherein the two different parts are screwed to one another.

21. A rotary mower according to claim 1 wherein the pivoting of the arm upwardly and or downwardly is limited by stops.

22. A rotary mower according to claim 21 wherein the pivoting of the arm is damped by two deformable elements, and wherein the stops consist of the deformable elements themselves.

23. A rotary mower according to claim 21 wherein:
   (a) a protrusion is formed on one of the arm and the frame and
   (b) the protrusion contacts the stops at the extremes of the pivotal movement of the arm, said stops being arranged on one of the frame and the arm.

24. A rotary mower according to claim 23 wherein the protrusions extend between two deformable elements.

25. A rotary mower according to claim 21 wherein the pivoting of the arm upwardly or downwardly is limited by the limits of travel of a damping piston in a damping cylinder.

* * * * *